J. M. PALMER.
FERNERY.
APPLICATION FILED AUG. 1, 1917.
1,295,581. Patented Feb. 25, 1919.
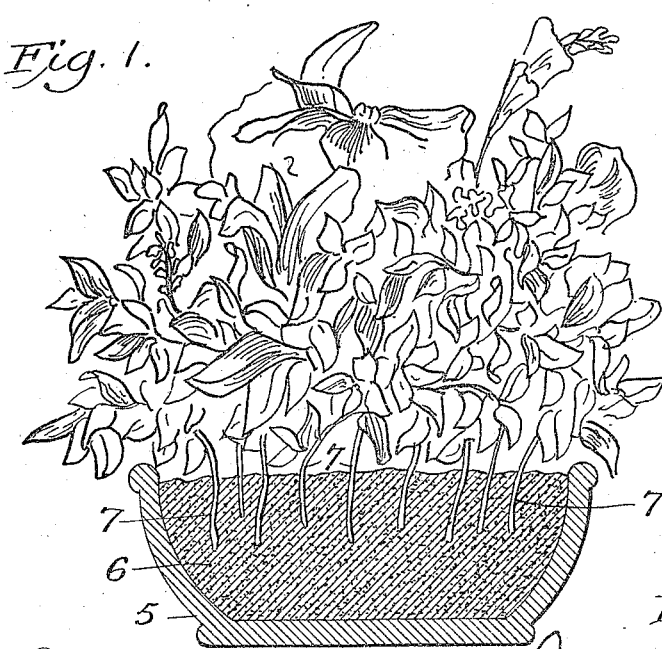
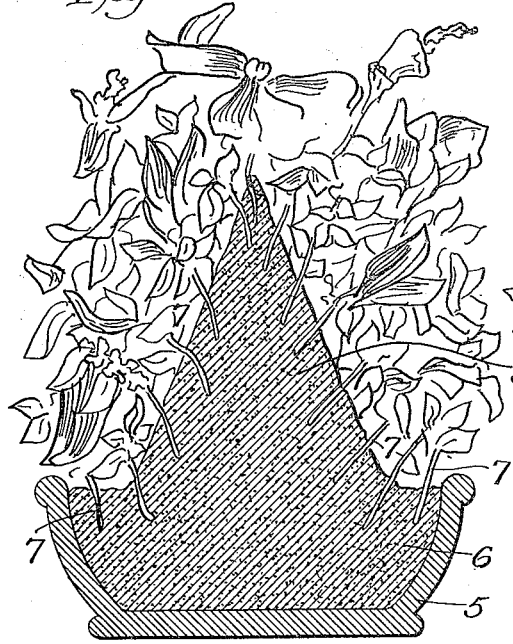
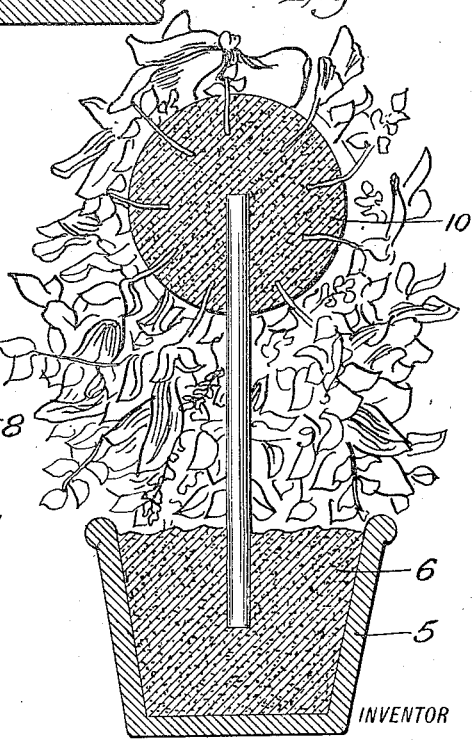
INVENTOR
Jacob M. Palmer,
BY
James F. Duhamel,
ATTORNEY

UNITED STATES PATENT OFFICE.

JACOB M. PALMER, OF BROOKLYN, NEW YORK.

FERNERY.

1,295,581.  Specification of Letters Patent.  Patented Feb. 25, 1919.

Application filed August 1, 1917.  Serial No. 183,820.

*To all whom it may concern:*

Be it known that I, JACOB M. PALMER, a citizen of the United States, and resident of Brooklyn, in the county of Kings and State of New York, have invented certain new and useful Improvement in Ferneries, of which the following is a specification.

This invention relates to ferneries and pots for plants and its object is to provide a bowl or pot into which is deposited a foundation of plastic material adapted to receive the stems of either natural or artificial flowers and allowed to dry and harden with the stems so disposed and secured. When natural plants are thus secured they are afterward painted or varnished or otherwise treated to preserve them in their natural appearance.

These and other objects and details of the invention are more fully described in the following specification, set forth in the appended claims and illustrated in the accompanying drawings, wherein:

Figure 1 is a sectional view through a bowl of flowers showing the invention.

Fig. 2 is a modified form of the same.

Fig. 3 is another modified form of the invention.

In the arrangement and display of artificial flowers or preserved flowers it has been the practice heretofore to fill the bowl or pot with earth or grass or some loose material into which the stems of the plants or sprigs are stuck and secured. There are serious objections to this arrangement, particularly on account of the plants being easily pulled out and the dirt being scattered outside of the bowl.

These objections are overcome by the present invention in which the bowl or pot 5 may be of any desired size and shape and in the same enough plastic material 6 in its moist or semi-fluid condition is placed to nearly fill the same and before the mass of material dries or hardens, the stems 7 of flowers or grasses are stuck.

When the plastic material dries the stems are firmly held in place and it will be found almost impossible to pull them out.

The material 6 may be plaster of Paris, Portland cement, mortar, tar or any similar and cheap material which will harden and remain permanently so after the stems 7 are stuck therein.

The plastic material when hardening also attaches itself to the inner sides of the bowl 5 and all parts of the device are therefore integral and the contents of the bowl so weights it that there is no tendency for the same to overturn.

After the arrangement of the plants and their stems is completed, the upper surface of the material may be painted green so that its rough and irregular surface may resemble moss or grass and the whole present an attractive appearance and not be liable to tip over or soil or litter the table or stand on which it is placed.

In the modified form shown in Fig. 2 the plastic material not only fills the bowl but a cone 8 of the same material arises from the base 6 and sprigs of plants or flowers are stuck therein to produce a conical or pyramidal effect while in Fig. 3 a stem 9 of wood or suitable material is inserted in the mass 6 and at the top of this stem is located a ball 10 of plastic material into which may be inserted the stems 7 of sprigs or sprays and a tree represented.

It is obvious that the device is capable of other modifications to present novel and pleasing designs without departing from the essential features above described or from the scope of the appended claim.

What I claim as new is:

In a fernery, the combination with a container having a wide opening and an inner retaining wall, of a mass of plastic material placed therein and allowed to harden, and cut plants whose stems have been stuck into the mass when soft and adapted to be retained thereby when it hardens.

Signed at Brooklyn, in the county of Kings and State of New York, this 23rd day of July, A. D. 1917.

JACOB M. PALMER.